United States Patent
Angarola et al.

[15] 3,654,033
[45] Apr. 4, 1972

[54] STRAP TENSIONING AND SEALING TOOL

[72] Inventors: Barry R. Angarola, Schaumburg; Robert J. Nix, River Grove, both of Ill.

[73] Assignee: Signode Corporation

[22] Filed: Apr. 1, 1970

[21] Appl. No.: 24,667

[52] U.S. Cl.................................156/494, 53/198 R, 100/30 X
[51] Int. Cl........................................................B32b 31/16
[58] Field of Search.................156/494, 495, 73; 53/198 R; 100/30

[56] References Cited

UNITED STATES PATENTS

| | | |
|---|---|---|
| 3,442,735 | 5/1969 | Stensaker ........................... 156/73 |
| 3,442,733 | 5/1969 | Vilcins ............................... 156/73 |
| 3,447,447 | 6/1969 | Rutty ................................. 100/30 X |
| 3,493,014 | 2/1970 | Orban et al. ....................... 100/30 X |

Primary Examiner—Benjamin A. Borchelt
Assistant Examiner—H. J. Tudor
Attorney—Edward R. Lowndes

[57] ABSTRACT

A fully automatic cyclicly operable strapping tool for tensioning a loop of fusible plastic strapping having overlapping end regions about an object and thereafter, when a predetermined degree of tension has been attained in the loop, severing the tensioned loop from the source of strapping and effecting and maintaining interfacial friction between such end regions until fusion welding takes place, after which interfacial pressure is maintained until solidification occurs.

15 Claims, 18 Drawing Figures

Patented April 4, 1972
3,654,033
6 Sheets-Sheet 1
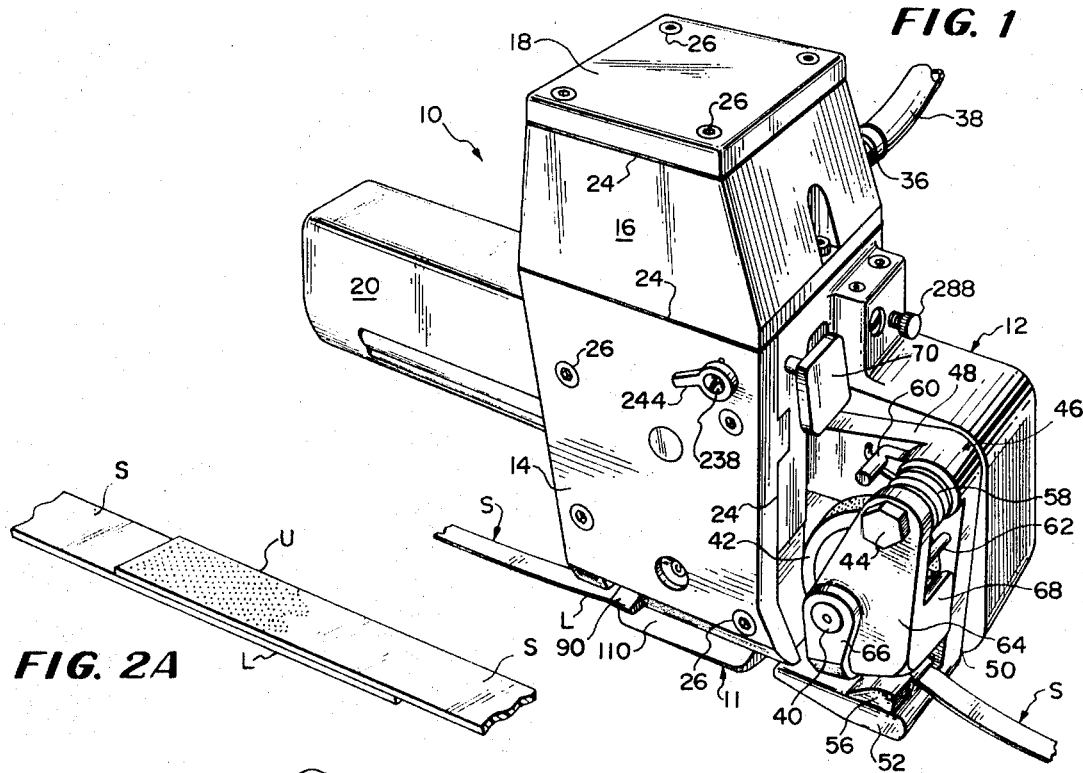
FIG. 1
FIG. 2A
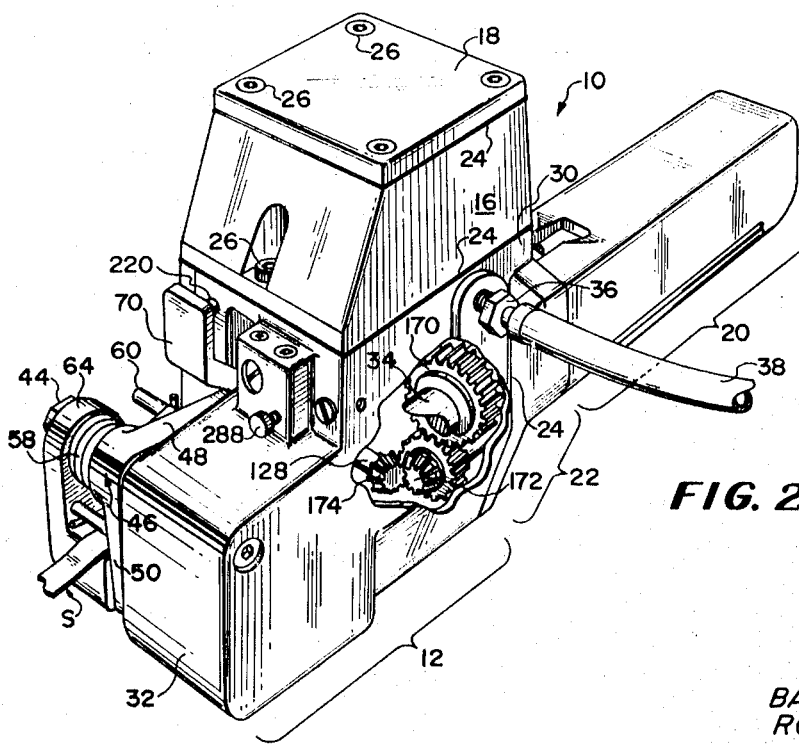
FIG. 2
INVENTORS:
BARRY R. ANGAROLA
ROBERT J. NIX
By Edward R. Lowndes

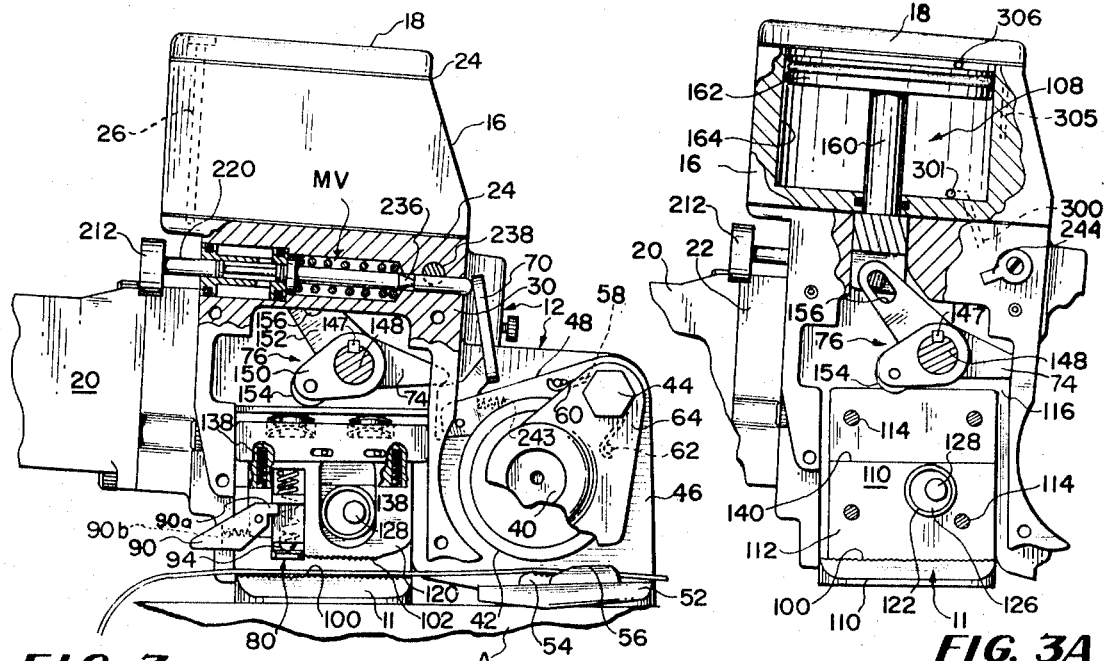

Patented April 4, 1972
3,654,033
6 Sheets-Sheet 3
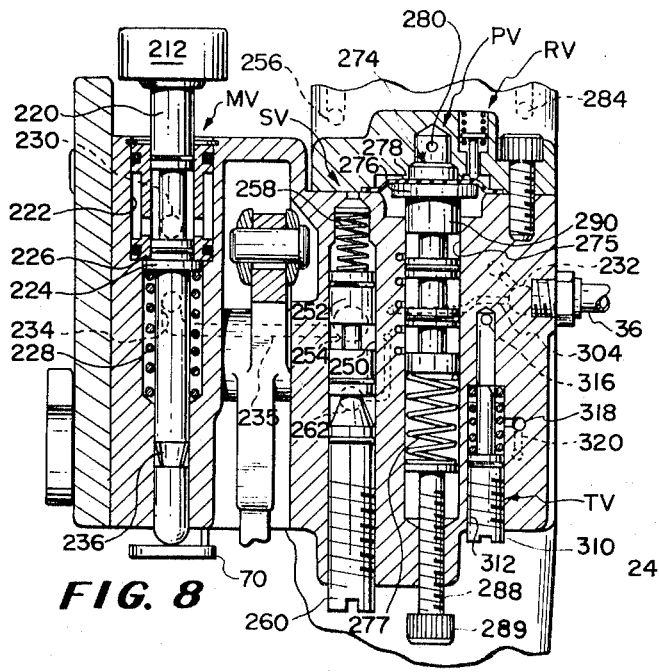
FIG. 8
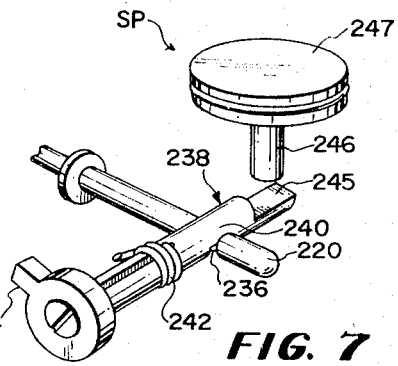
FIG. 7
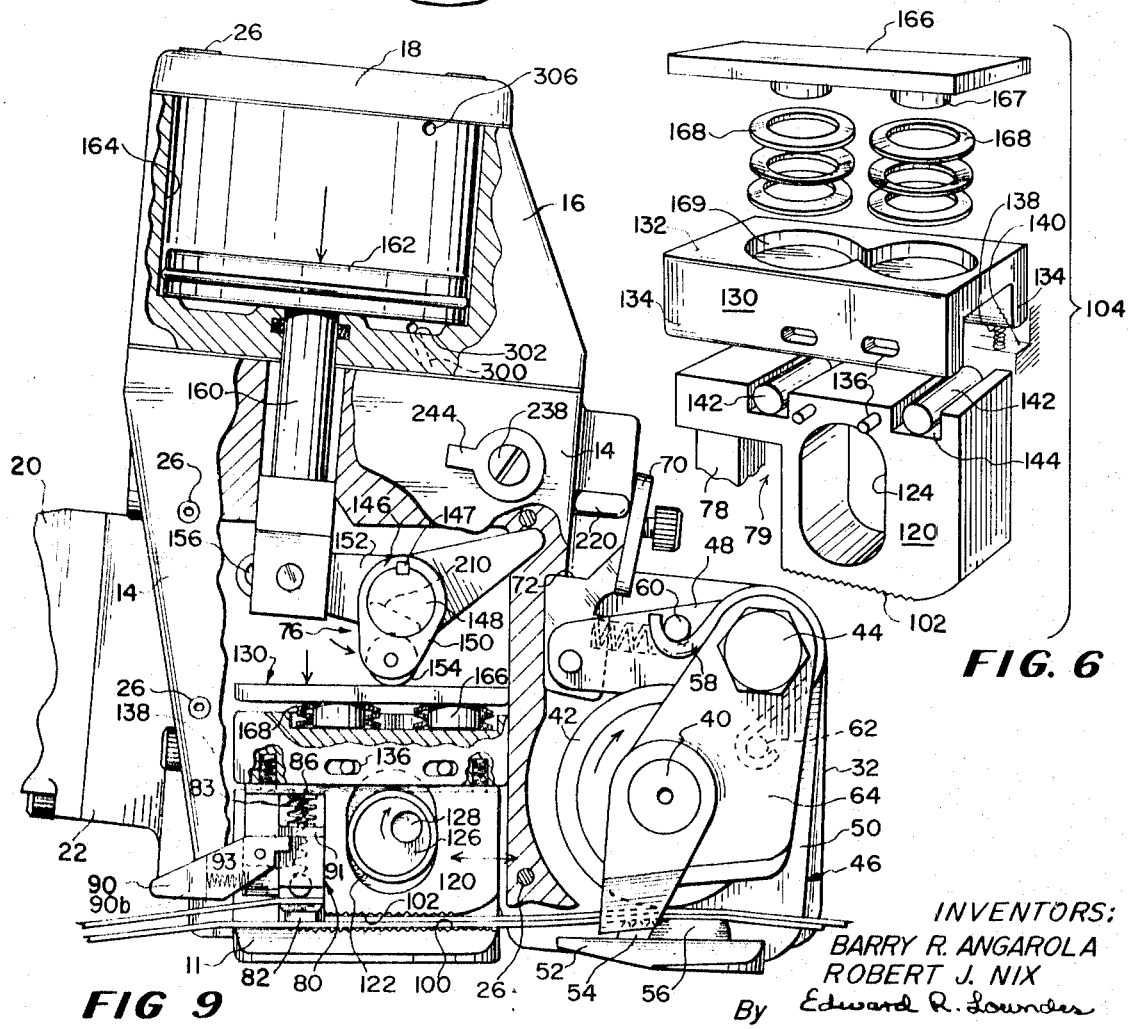
FIG. 9
FIG. 6
INVENTORS:
BARRY R. ANGAROLA
ROBERT J. NIX
By Edward R. Lowndes

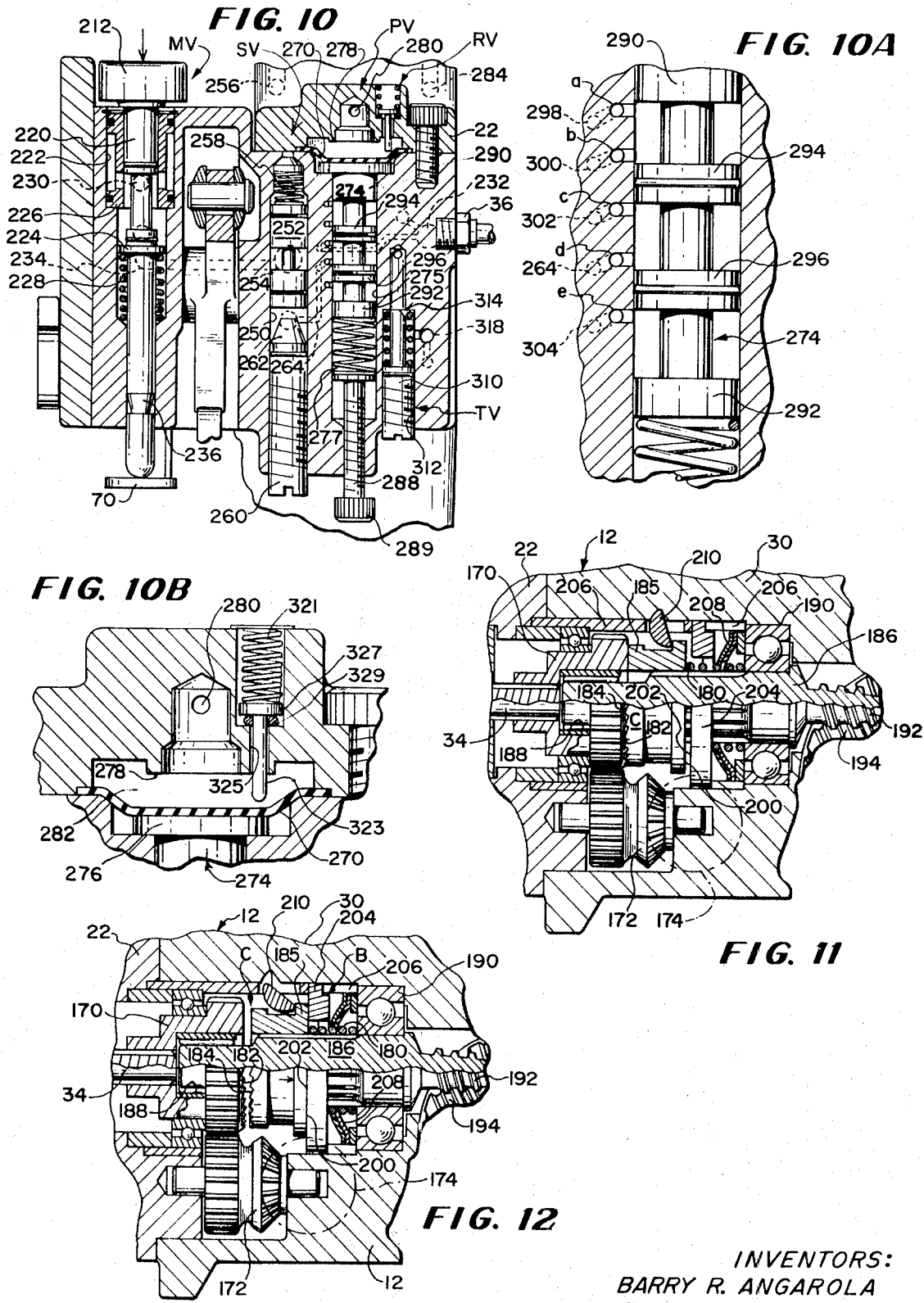

Patented April 4, 1972

INVENTORS:
BARRY R. ANGAROLA
ROBERT J. NIX

By: Edward R. Lowndes

3,654,033

STRAP TENSIONING AND SEALING TOOL

OUTLINE OF THE INVENTION

The present invention relates to package binding tools, commonly referred to as strapping tools, and by means of which a loop of strapping which has been caused to encircle an article, or series of articles, is tensioned, after which the overlapping end regions of the loop are effectively sealed to each other to maintain loop tension after the thus strapped article is released from the tool, as well as from the source of strapping.

A comparatively recent innovation in the strapping field resides in the development of strapping tools which are designed to operate upon fusible thermoplastic strapping and in which the joint or seal between the overlapping regions of the tensioned loop is established by effecting interfacial rubbing of these regions, one against the other, to develop a degree of friction-induced heat sufficient to fuse the interfacial contacting surfaces and cause them to blend together so that after the friction-producing operation has been terminated solidification takes place and a weld or seal is produced. Such strapping tolls are possessed of numerous advantages, principal among which is the elimination of the necessity of utilizing crimped metal seals which require special seal handling mechanism such as seal magazines, seal feeding instrumentalities, and power-actuated seal crimping jaws, not to mention the cost of seal manufacture and the necessity for preliminary manual seal handling in loading such seals into a seal magazine.

The present invention is specifically concerned with a portable pneumatically operable strapping tool of the type which produces a friction-fused joint or seal as briefly outlined above and which functions cyclicly in substantially a novel and fully automatic manner after the strapping has been properly loaded into the tool in article-encircling relationship, and a start button depressed, to perform all of the tensioning, fusion-sealing and strap severing functions associated with earlier tools designed for the same purpose, as well as performing these and additional advantageous functions in a controlled manner to the end that more uniform fusion sealing than has heretofore been possible is attained, while at the same time adjustments may be made to vary the character of the fused seal to accommodate varying strapping conditions and requirements such as strap thickness, strap composition, desired strap loop tension, and the like.

Briefly, in carrying out the invention, separately operable loop tensioning and friction-fusion seal forming instrumentalities are provided and are sequentially operable under the control of a single common pneumatic motor, each to the exclusion of the other. The loop tensioning instrumentalities include clamping means for fixedly anchoring the free end region of the strapping loop, together with a fixed-axis feed wheel and a cooperating movable anvil foot between which the overlapping regions of the strapping loop extend and which, during the tensioning operation effectively compresses these regions against the rotating feed wheel so that the feed end of the loop slides unidirectionally on the clamped free end region. The seal forming instrumentalities include a vertically shiftable constantly reciprocating pressure jaw and a cooperating fixed pressure jaw and between which the feed end and the free end region of the strapping tool extends in such a manner that the stationary jar engages the inside or lower overlap of the loop while the movable reciprocating jaw engages the outside or upper overlap. A divided gear train leading from the motor is permanently coupled to the movable pressure jaw and is releasably coupled to the feed wheel, the latter coupling means including a normally engaged clutch which, when engaged, effects driving of the feed wheel and which, when disengaged, effects automatic engagement of a feed wheel brake for the purpose of maintaining feed wheel tension in the strapping loop during the sealing operation.

Disengagement of the clutch and consequent engagement of the brake is effected under the control of a piston-actuated ram having a main operating cylinder which automatically becomes actuated when a predetermined degree of tension has been attained in the strapping loop under the influence of the rotating feed wheel to first disengage the clutch and engage the brake to hold loop tension, and immediately thereafter to force the constantly reciprocating jaw member into frictional engagement with the upper or outside overlap of the tensioned loop to, in turn, force such overlap (which now is also reciprocating in unison with the jaw) into dynamic frictional engagement with the lower or inside overlap which is then held in static engagement with the stationary jaw. The energy which is thus developed to oppose the sliding friction between the overlapped surfaces is converted into heat and the heat thus generated is adequate to effect the desired fusion of the interfacial region of the overlapped strap for welding purposes. A shearing or cutter edge provided on the reciprocating movable jaw serves to shear the tensioned strapping loop from the strap supply immediately prior to the fusion-sealing portion of the tool cycle. Means are provided for controlling the duration of the fusion weld time, as well as for automatically restoring the tool parts to their initial positions after a slight delay in order to permit solidification of the fused and blended interfacial surfaces of the overlapped portions of the strapping loop.

The proper sequence of tool operations as briefly outlined above is maintained largely by a series of novel pneumatic control devices, the nature of which will be made clear subsequently and each of which functions substantially to completion and then initiates the operation of a succeeding control device, the chain reaction being initially set off by depression of a single start button. Briefly depression of such button, after proper loading of the tool with strapping, effects opening of a main valve and also effects a mechanical self-locking function which maintains the button depressed and the valve open. It also effects a latch release function which allows the aforementioned feed wheel and anvil to engage the strapping for tensioning purposes. Such opening of the valve causes air under pressure to be conducted to the motor through an adjustable speed control valve which regulates the rate of flow of such air and consequently constitutes an adjustment for ultimate strapping loop tension. The motor thus drives the feed wheel by way of the aforementioned normally engaged clutch. As the tension in the strapping loop increases, the air motor approaches a condition of stall and the back-up pressure in the line leading to the motor is increased. When this back-up pressure reaches a predetermined maximum due to feed wheel resistance, such pressure is sensed by an adjustable plunger valve which then shifts its position and directs air to the cylinder for the piston-actuated ram in such a manner as to actuate the ram and thus effect clutch disengagement and brake application to terminate the strap-tensioning portion of the tool cycle and initiate the fusion-sealing portion thereof as previously described.

In addition to effecting the application of air to the ram cylinder, shifting of the plunger valve also causes air to be conducted to the speed control valve which then shifts to its wide open position and allows maximum air pressure to be conducted to the air motor to satisfy the increased power requirements of the reciprocating movable jaw which has now moved into effective cooperation with the stationary sealing jaw under the influence of descent of the ram. Such shifting of the plunger valve also serves to bleed air through an adjustable orifice to an accumulation chamber in which air pressure gradually builds up until such time as such pressure overcomes the resistance of a spring-pressed latch release or "stop" piston which then operates mechanically to disable the self-locking function of the start button, thus restoring the latter, together with its associated main valve, to their initial positions. Such restoration of the start button and valve discontinues the supply of air to the air motor, as well as to the plunger valve which also is restored to its initial position, thus reversing the supply of air to the ram cylinder and causing the ram and pressure jaw to be raised, thereby restoring the brake to its disengaged condition and the clutch to its engaged condition, while at the same time forcibly restoring the anvil foot to its retracted position out of effective cooperation with the now stationary feed wheel. Shifting of the upper pressure applying jaw and anvil foot to their retracted or normal positions thus releases the tensioned and sealed strapping loop for removal from the tool.

In addition to the above-outlined pneumatic control features of the present invention, numerous novel mechanical features are associated therewith and will be described in detail subsequently after the nature of the tool is better understood. For example, a novel dual-purpose strap clamp and cutter block together with an associated latch release device facilitates initial loading of the tool with strapping and perform various functions during tool operation. Additionally, various motion-transmitting devices including crank arms, eccentric drive devices, cam arrangements, antifriction rollers, latch mechanisms, automatic release devices, biasing springs and the like, all of which are operatively assembled in a novel cooperating relationship, contribute either individually or collectively to the novelty of the present invention. These and other features of novelty, not at this time enumerated, will readily become apparent or suggest themselves as the nature of the invention is better understood.

In the accompanying six sheets of drawings forming a part of this specification, one exemplary form of the invention has been shown.

In these drawings:

FIGS. 1 and 2 are respective perspective views of a strap tensioning and sealing tool embodying the principles of the invention and showing the same in the air-energized condition which it assumes both at the commencement and at the end of an operating cycle;

FIG. 2A is a fragmentary perspective view of a strap overlap joint which is effected by the tool of FIGS. 1 and 2;

FIG. 3 is a fragmentary side elevational view, partly in section and with certain parts removed, showing the tool in its normal air-applied condition during loading thereof and with the lower or free end region of the strapping loop loosely inserted in the tool prior to insertion of the upper or feed end region;

FIG. 3A is a fragmentary side elevational view, partly in section and with one of the casing side plates and an internal sealing jaw assembly removed in order to further illustrate certain underlying components;

FIG. 4 is a fragmentary side elevational view similar to FIG. 3, showing the parts in the positions which they assume after the lower free end region of the strap loop has been placed in position in the tool but prior to clamping thereof between the feed wheel and anvil foot;

FIG. 5 is a sectional view taken substantially on the line 5—5 of FIG. 4;

FIG. 6 is an enlarged exploded perspective view of a sealer block and pressure pad assembly employed in connection with the invention;

FIG. 7 is an enlarged fragmentary detail perspective view of a locking pawl and latch release piston assembly employed in connection with the invention;

FIG. 8 is a horizontal sectional view taken through the valve section of the tool and on the line 8—8 of FIG. 5, the valve parts being shown in the positions which they assume at the commencement of tool operations;

FIG. 9 is a fragmentary enlarged side elevational view partly in section, showing the parts in the positions which they assume during the actual formation of the fusion joint between the overlapping upper and lower regions of the strapping loop which are held under pressure between the movable and stationary jaws;

FIG. 10 is a sectional view similar to FIG. 8 with the valve parts being shown in the positions which they assume during the sealing operation;

FIG. 10A is a fragmentary enlarged sectional view showing a plunger valve, which is illustrated in FIG. 8, in greater detail;

FIG. 10B is a fragmentary enlarged view of a portion of FIG. 10 and illustrating the relationship between a plunger valve and its associated relief valve;

FIG. 11 is a sectional view taken substantially on the line 11—11 of FIG. 5 and illustrating a strap-tensioning and sealing gear train embodying a brake and clutch assembly, the clutch being engaged and the brake released;

FIG. 12 is a sectional view similar to FIG. 11, showing the clutch disengaged and the brake applied;

BRIEF DESCRIPTION

Figure 13:
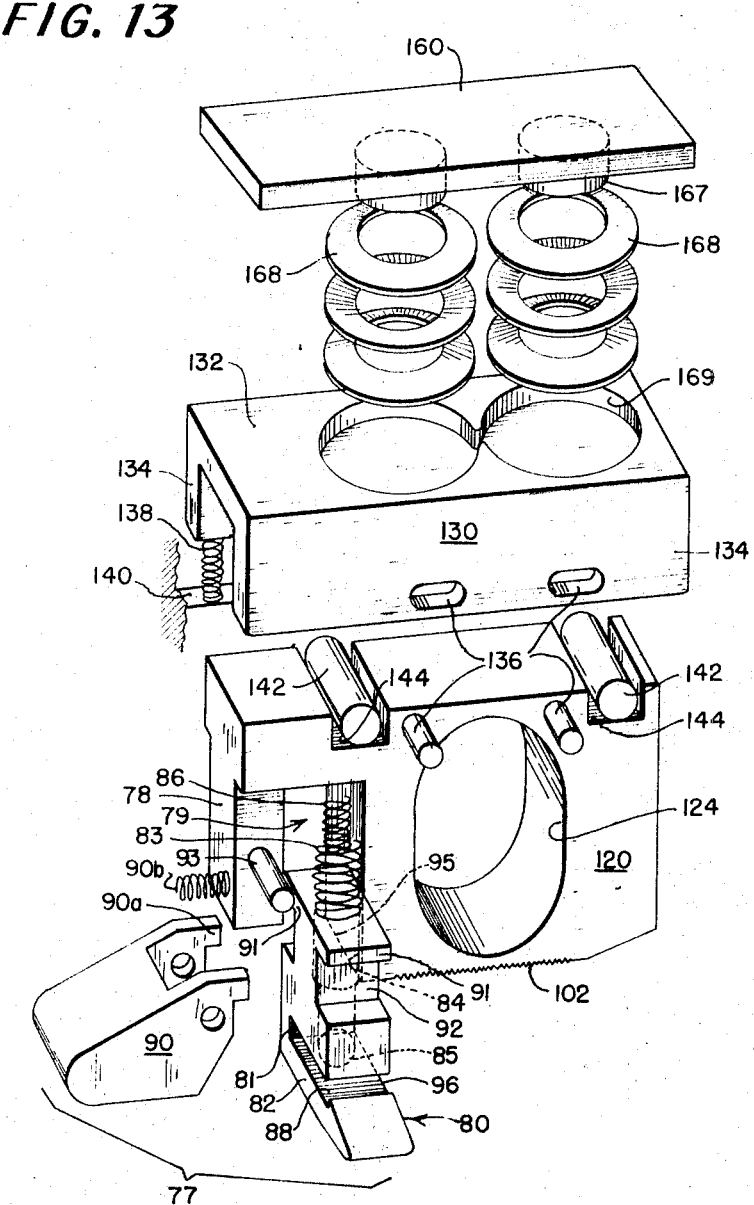
FIG. 13 is an enlarged exploded perspective view of a combined cutter element and strap clamp employed in connection with the tool and showing its relationship with respect to the sealer block.

Referring now to the drawings in detail and in particular to FIGS. 1 and 2, a strapping tool embodying the principles of the present invention has been designated in its entirety at 10 and is intended for the purpose of tensioning a loop of thermoplastic strapping material such as nylon, polypropolene or other fusible material about an article, or series of articles, and thereafter, when the desired degree of tension has been attained in the strapping loop, effecting a seal between the overlapping portions of the loop by creating a fusion weld between the abutting interfacial surfaces of such overlapping portions. Accordingly, in FIG. 4, the tool is shown as being seated upon an article A which is to be strapped, the not yet tensioned loop of strapping S being considered to encircle the article and being operatively threaded or loaded in the tool. The overlapping portions of the loop (which will hereinafter be referred to simply as the overlap) include a lower free end region L and an upper feed end region U, the latter extending from a suitable source of the strapping as, for example, a dispensing reel (now shown). As will be described in detail presently, the lower region of the tool 10 encompasses these overlapping portions of the strapping loop and establishes a forward tensioning station TS (FIG. 4) where a feed wheel and anvil arrangement engages the overlap and causes the upper strap overlap U to slide rear-wardly on the lower strap overlap to shrink the loop about the article A in the usual manner of feed wheel operation. The lower region of the tool also establishes a sealing station SS rearwardly of the tensioning station TS where a pair of cooperating pressure-applying sealing jaws including a fixed jaw and a reciprocating jaw compress the overlap therebetween and thus effect relative sliding friction between the overlap laminae for the purpose of generating sufficient heat of friction to melt or fuse the interfacial region of the overlap and effect a fusion weld. The lower region of the tool further establishes a strap-cutting or severing station CS immediately rearwardly of the sealing station SS where the supply of strapping is severed from the tensioned loop at such time as the desired degree of tension is attained therein and immediately prior to the sealing operation. During the sealing operation, the feed wheel and anvil arrangement discontinue their strap-feeding function and operate to hold the tension in the strapping, not only for the duration of the sealing operation but also for a short period thereafter to allow the fused interfacial surfaces of the overlap to become hardened or set to create a permanent weld or seal.

THE TOOL FRAMEWORK

The strapping tool 10 involves in its general organization a fixed tool base 11 and a six-part casing including a main casing section 12, a side closure plate 14 for such section, an upper cylinder section 16, a cover plate 18 therefor, a rearwardly projecting motor section 20, and an intermediate motor mount section 22 between the motor section 20 and the main section 12, the various sections being indicated by brackets in FIG. 2. Suitable sealing gaskets 24 are interposed between the adjacent casing parts and fastening screws 26 are provided at appropriate places to releasably hold the various parts together in their assembled relationship.

Figure 14:
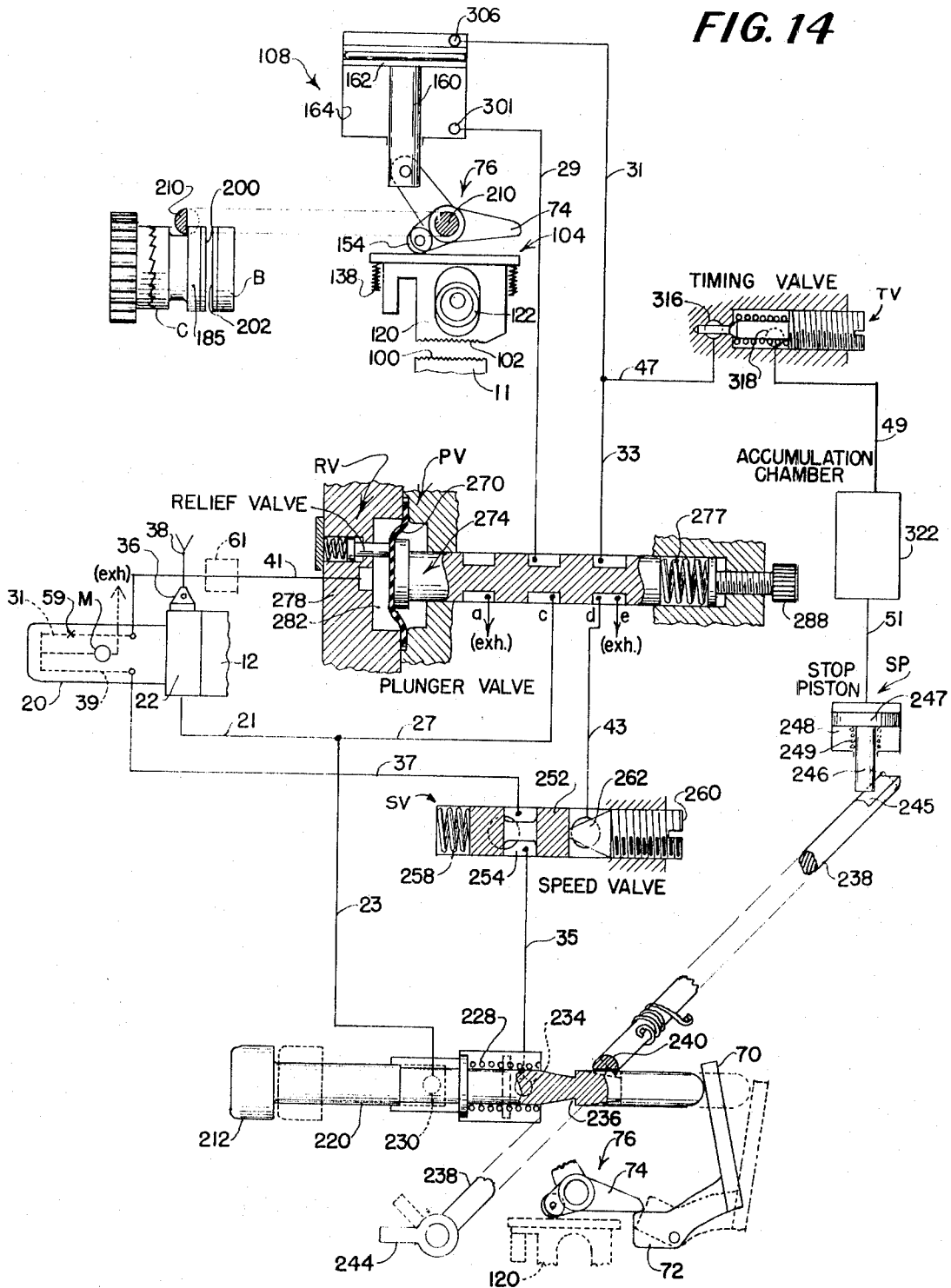
FIG. 14 is a pneumatic circuit diagram, entirely schematic in its representation, showing the pneumatic control mechanism by means of which the tool is operated.

The main casing section 12 is supported on the tool base 11 and the latter is adapted to be supported on an article such as the article A in FIG. 4 undergoing strapping. This main section 12 includes M , relatively large rear portion 30 and a forwardly projecting extension 32 of reduced transverse dimensions. The casing section 20 serves as the outer casing of a conventional air-operated motor M, which is schematically shown in FIG. 14 only a splined extension 34 of the output shaft of such motor appearing in FIGS. 11 and 12. The motor section serves as a convenient handle for engaging and positioning the tool with respect to an article undergoing strapping. The motor is adapted to be supplied with air under operating pressure by means of internal connections which extend from the quick-release fitting 36 that extends into the motor mount casing section 22 and is adapted to be connected to a flexible air supply line 38.

As will be apparent when the nature of the invention is better understood, the main casing section 12 constitutes, in effect, a gear box which houses a selectively operable divided gear train leading from the motor output shaft extension 34 and one section of which extends to the tensioning instrumentalities at the tensioning station TS and the other section of which extends to the sealing instrumentalities at the sealing station for pressure jaw reciprocation. The rear portion 30 of the casing section 12 also encloses the aforementioned reciprocating pressure sealing jaw as well as the strap-severing instrumentalities, together with certain operating mechanism therefor and the upper region of such casing section 12 constitutes a valve housing for certain control valve devices, valve passages and other pneumatic adjuncts the details of which appear in FIG. 8 and elsewhere in the drawings. The cylinder section 16 of the composite casing structure encloses a piston and ram device for operating a crank arm arrangement by means of which the pressure applying sealing jaws are moved relatively into and out of cooperation with each other.

THE STRAP TENSIONING MECHANISM (Feed Wheel and Anvil Arrangement)

As best seen in FIGS. 1, 2, 3, 4, 5 and 9, a horizontal strap-tensioning feed wheel shaft 40 extends completely across the casing extension 32, projects laterally therefrom and has fixedly secured thereto a feed wheel 42 exteriorly of the casing extension 32, the feed wheel being nested within a recessed portion of the casing section 12 which exists between the forward side of the main body portion 30 and the adjacent or inner side of the casing extension 32. At a region above the level of the feed wheel, a stud 44 is threadedly received in the inner side of the casing extension 32 and constitutes a pivot shaft for a generally C-shaped foot casting 46 having a generally horizontal upper leg 48 (FIG. 1) and a depending generally vertical leg 50 which projects downwardly alongside the feed wheel and which is provided at its lower end with a forwardly and laterally projecting tensioner foot 52. A strap-contacting gripper plug or anvil 54 and a strap guide element 56 are mounted on the upper face of the tensioner foot 52, the gripper plug normally underlying the feed wheel 42 and being designed for cooperation with the latter for strap-engaging purposes in the usual manner of feedwheel and anvil cooperation when the foot casting 46 is swung in a clockwise direction as viewed in FIGS. 4 and 5. A spring 58 encircles the stud 44, and bears at one end against a pin 60 on the horizontal leg 48 and at its other end against a similar pin 62 provided on a fixed outer link 64 which extends between the stud 44 and the feed wheel shaft 40, thus biasing the foot casting 46 in a clockwise direction as viewed in FIG. 9. The outer link 64 is formed on its outer side with a raised boss-link protuberance 66 which projects slightly below the level of the feed wheel 42 as shown in FIG. 5 and cooperates with the strap guide element 56 in serving as an edge guide for the strapping undergoing tensioning. The outer link 64 is further formed with a lateral protective guard or shield portion 68 (FIGS. 1 and 5) which projects transversely across the feed wheel in close proximity thereto. The tensioner foot casting 46 is movable between the retracted strap-releasing position wherein it is shown in FIG. 3 and 4 where the gripper anvil 54 is remote from the feed wheel, and the advanced strap-engaging position wherein it is shown in FIG. 9 where the gripper anvil 54 engages the strap overlap and forces the same upwardly against the feed wheel 42. Normally, at such time as air initially is supplied to the tool and prior to commencement of the strapping operation, the foot casting 46 is maintained in its retracted strap-releasing position by a foot-release latch element 70 (FIGS. 1, 2, 3, 9 and 14) which is pivoted to the horizontal leg 48 of the foot casting and has a latch shoulder 72 which is normally engaged by a radial latch finger 74 provided on a spider-like crank member 76 the nature of which will be made clear presently.

(The Cutter Latch and Strap Clamp Assembly)

As an adjunct to the strap loop tensioning mechanism, there is provided a multi-purpose combined strap-clamping and cutter latch assembly which is shown in detail in FIG. 13 and designated by the bracket 77. This assembly constitutes the subject matter of a divisional application, Ser. No. 24,587, filed of even date herewith, and entitled "Strap Clamping and Severing Assembly for Strapping Tools." Consequently, no claim is made in the present application to any novelty associated with the same. The assembly 77 serves first to hold the free end region of the strap loop, i.e. the lower strap overlap, in position at the time it is initially loaded into the tool; secondly to function as a cutter anvil by presenting a sharp shearing edge which cooperates with a counterpart shearing edge on the movable pressure jaw element or sealer block after the strap loop has been tensioned and the sealing operation commences in order to sever the strap loop from the source of strapping; thirdly to capture the severed free end of the strapping and hold it in a position at such time as the severing operation takes place so that it will be conveniently available for manipulation during the next succeeding strap-loading operation; and fourthly to guide the upper strap overlap during strap tensioning.

The strap severing operation of the cutter latch assembly can best be described after the nature of the strap-sealing mechanism is clearly understood inasmuch as this entire assembly 77 is bodily carried by and is movable on the upper reciprocating sealing jaw member. Therefore, only the strap clamping features of this cutter latch assembly will be described at this time. For this purpose it is essential that at least the general nature of the upper sealing jaw member be understood. Accordingly such jaw member is in the form of a constantly reciprocating vertically shiftable sealer block 120 (FIG. 13), the underneath surface of which is provided with gripper teeth that cooperate with similar gripper teeth provided on the lower sealing jaw member in a manner that will be described when the nature of the sealing mechanism is set forth. A depending leg 78 on the sealer block, in combination with the rear face of the block, defines a recess or guideway 79 within which a cutter latch proper 80 is vertically movable with respect to the block. This cutter latch is in the form of a machined casting which is provided with a slot 81 in one side thereof for reception of the upper strap overlap U at the time the strapping is loaded into the tool as shown in FIG. 4. The slot 81 defines a laterally projecting pressure foot 82, the underneath side of which is designed for cooperation with the fixed tool base in clamping the lower strap overlap L in position in the tool after the strap loading operation has been completed. A spring 83 yieldingly urges the cutter latch downwardly to establish the necessary strap-holding pressure against the base, the spring bearing at its upper end against an underneath surface of the block 120 within the recess or guideway 79.

The slot 81 is adapted to receive therein the upper strap overlap U at the time the strapping loop is undergoing formation and the tool is being loaded. To hold this upper overlap U, the cutter latch 80 is formed with a vertical bore 84 therein and a detent ball 85 is floatingly disposed within this bore and is spring biased downwardly by means of a small diameter spring 86 which passes through the spring 83 and bore 84 and bears at its upper end against the aforementioned surface on the block 120. The detent ball thus exerts a light pressure on the upper strap overlap and holds it in position during strap tensioning when the strap slides forwardly on the upper face of the foot and is guided in its sliding movement by a raised shoulder 88 on the foot 82. It further functions to capture the excess strapping which is cut from the loop after the tensioning operation has been completed as will become clear when the operation of the tool is set forth.

Normally, the cutter latch 80 is held in a raised position relative to the block 120 by means of a latch release element 90 which is bifurcated to provide a pair of latch fingers 90a which project beneath a pair of latch shoulders 91 defined by a pair of slots 92 in the cutter latch. This latch release element is spring biased as indicated at 90b. The cutter latch is pivoted on a pin 93 mounted on the depending leg 78. The latch release element 90 thus moves bodily and vertically with the sealer block 120. During relative vertical movement between the cutter latch and the sealer block, a shearing edge 96 on the foot 82 cooperates with a shearing edge 95 on the sealer block to sever the tensioned strapping loop from the strapping source, thus leaving the free end of the strapping captured as previously stated.

The above described cutter latch assembly 77 is directly related to the initial loading of the strapping into the tool. As shown in FIG. 3 in the normal position of the tool, after air has been supplied thereto through the quick-release fitting 36, the latch release element 90 maintains the cutter latch 80 in its raised position with respect to the sealer block 120 (which is also in its raised position) so that the free end of the strapping may be slid sidewise between the feed wheel 42 and tensioner foot 52 which, at that time, remain separated. This free end region is also slid sidewise over the tool base 11 and beneath the pressure foot 82 of the cutter latch 80. At this time the latch release element 90 is manually operated to release the cutter latch 80 as shown in FIG. 4 and allow it to move downwardly relative to the sealer block 120 for clamping engagement with such free end region which subsequently becomes the lower strap overlap L. The strapping is then passed around the article and slid sidewise between the detent ball 85 and pressure foot 82 where it becomes frictionally captured, thereby establishing an untensioned strap loop having upper and lower overlap portions U and L and which subsequently becomes tensioned and thus shrunk upon the article as soon as the tensioner foot is automatically brought into effective engagement with the rotating feed wheel 42 incident to commencement of the tensioning tool cycle as will be described presently.

It is to be noted at this point that when the cutter latch 80 is initially released by depression of the latch release element 90, the cutter latch comes to rest on the lower strap overlap L in such a position that the latch fingers 90a of the element 90 now overlie the upper end of the cutter latch, the sealer block 120 at this time remaining in its raised position. Thereafter, at the commencement of the sealing operation when the sealer block moves downwardly, the latch shoulders 91 by-pass or trip the fingers 90a of the latch release element and these fingers again underlie the latch shoulders 91 so that when the sealer block is raised at the end of the tool cycle, the cutter latch moves upwardly with the block and assumes its initial raised latching position.

THE STRAP SEALING MECHANISM

The previously mentioned strap-sealing mechanism which effects a fusion weld between the upper and lower strap loop overlaps U and L at the sealing station SS (FIGS. 3 and 4) includes the aforementioned fixed and reciprocating sealing jaws, the former being indicated at 100 and the latter at 102. It further includes a sealer block and pressure pad assembly 104, the details of which are shown in FIG. 6; the previously mentioned jaw-actuating crank member 76 (FIGS. 3A and 14); and a piston and ram assembly 108 for actuating the crank assembly.

(The Lower Sealing Jaw Assembly)

The fixed lower sealing jaw proper 100 is established by the provision of a series of gripper teeth on the upper surface of the fixed tool base 11, this base being in the form of a generally L-shaped casting having a lateral leg or foot proper 110 and a vertical plate-like leg 112 which is secured by screws 114 to a central partition wall 116 which is disposed within the casing section 12. It will be understood that in the interests of clarity, the side cover plate 14 which appears in FIGS. 1 and 9 has been removed in FIG. 3, 3A and 4, thus revealing the nature of the crank member 76, the foot casting 110, 112, and the sealer block and pressure pad assembly 104, 120, all of which lie within the confines of the casing section 12.

(The Upper Sealing Jaw Assembly and its Operating Mechanism)

The upper sealing jaw proper 102 is established by the provision of a series of gripper teeth on the underneath surface of the aforementioned constantly reciprocating sealer block 120 (FIGS. 3, 4, 6 and 9). This sealer block is adapted to be reciprocated in the longitudinal direction of the strap overlap under the influence of a rapidly oscillating bushing 122 which operates in a vertical slot 124 formed in the block 120 and is mounted on an eccentric portion 126 of a crank shaft 128. As will become apparent when the drive train leading to the bushing 122 is set forth, the bushing is continuously oscillatable, idle oscillation taking place during the early tensioning portion of the tool cycle and effective oscillation taking place during the later sealing portion of the tool cycle.

The constantly reciprocating sealer block 120 is movable bodily between the raised position in which it is shown in FIGS. 3 and 4, and the lowered position in which it is shown in FIG. 9. Normally, at the commencement of the tool cycle and during the tensioning portion of the cycle, the sealer block is maintained in its raised position under the influence of an upwardly biased pressure pad 130 which is illustrated in detail in FIG. 6 and which is in the form of an inverted channel member having a flat crown portion 132 with depending side flanges 134. The pressure pad seats upon the upper end of the jaw block in saddle-like fashion with the flanges 134 overhanging the sides of the block. Pin and slot connections 136 between the flanges and sides of the block allow for lateral reciprocation of the block, as well as providing a vertical thrust connection between the pad and the block. Upward biasing of the pad is accomplished by the provision of a pair of vertically disposed compression springs 138 (FIGS. 3, 6 and 9) which are interposed between the lower edge of one of the flanges 134 and a shelf 140 (FIGS. 3 and 3A) provided on the partition wall 116 within the casing section 12. Antifriction rollers 142, seated in grooves 144 in the upper face of the block 120 ride on the underneath side of the crown portion 132 during oscillation of the block 120.

During the sealing portion of the tool cycle, downward pressure is applied to the pressure pad and block by the piston and ram assembly 108 through the medium of the crank member 76. Accordingly, and as best shown in FIG. 9, the crank 76 is of spider-like construction and includes a central hub 146 which is keyed as at 147 on a transverse horizontal rock shaft 148 and from which there extend outwardly in radial fashion three arms including the aforementioned latch arm or finger 74, and two additional arms 150 and 152. The arm 150 carries a pressure roller 154 at its distal end while the arm 152 constitutes a crank arm and is connected by a pin-and-slot connection 156 to the lower end of a ram 160 associated with the previously mentioned piston and ram assembly 108. This latter assembly further includes a ram piston 162 (FIGS. 3A and 9) which operates in a cylinder 164 formed in the cylinder section 16 of the tool casing. Interposed between the pressure roller 154 and the sealer block for transmitting the downward pressure of the former to the latter is an upper spring retainer and pressure plate 166 (FIG. 6) having a pair of pilot lugs 167 on its underneath surface for two series of stacked Bellville type spring washers 168, the stacks seating at their lower ends in pilot recesses 169 formed in the upper surfaces of the pressure pad 130.

(The Divided Power Train for the Feed Wheel and Upper Sealing Jaw)

As previously stated, the sealer block 120 is continuously reciprocated throughout substantially the entire tool cycle from the time the air motor in the casing section 20 is energized until it terminates its operation at the end of the tool cycle. Toward this end a continuous unbroken power train of gearing extends from the splined motor shaft extension 34 (FIGS. 2, 11 and 12) to the crank shaft 128 which carries the oscillatable bushing 122, such gearing including main drive gear 170 which is splined to the shaft extension 34 and which meshes with a combination spur and bevel gear 172 which, in turn, meshes with a counterpart bevel gear 174 mounted on the aforementioned crank shaft 128 (FIG. 2). As previously indicated, although this power train is effective to cause reciprocation of the sealer block 120 during the early portion of the tool cycle while the feed wheel 42 is performing its strap-tensioning function, such reciprocation is without function and it is not until the piston ram 160 operates through the medium of the crank 76 and pressure pad assembly to lower the sealer block 120 and upper jaw 102 into cooperation with the lower jaw 100 that such reciprocation becomes effective against the upper strap overlap for sealing purposes.

The selectively operable power train leading from the extension shaft 34 of the air motor to the feed wheel shaft 40 includes a clutch C which normally is held in its engaged condition under the influence of a clutch spring 180 (FIGS. 11 and 12). This clutch embodies a clutch face 182 on the end face of the main drive gear 170 and a cooperating clutch face 184 on an axially shiftable combination clutch and brake element 185 which is splined to a rotary combined clutch and worm shaft 186 which has its rear end piloted in a socket 188 provided in the front face of the main gear 170 and which is supported adjacent its front end in bearings 190 carried by the casing section 12. The extreme forward end of the shaft 186 carries a worm section 192 (FIGS. 5, 11 and 12) which meshes with a spiroid gear 194 mounted on the feed wheel shaft 40.

When the clutch C is disengaged at the end of the strap-tensioning cycle as shown in FIG. 12, in the absence of the brake B the feed wheel would be free to rotate and thus dissipate the tension which is attained in the strapping loop during the initial tensioning portion of the tool cycle. The brake B is thus necessary to maintain loop tension during the sealing operation. The brake is established by reason of a friction face 200 on the axially shiftable element 185 and a cooperating brake surface 202 on a brake disk 204 which is held against rotation by a slotted spacer sleeve 206 and which is backed by a series of Bellville washers 208.

As will become more readily apparent when the operation of the tool is set forth, actuation of the combined brake and clutch member 185 is effected under the control of a locking pawl 210 (FIGS. 11, 12 and 14) formed on the aforementioned crank shaft 148, the normally engaged clutch C becoming disengaged and the normally disengaged brake B becoming engaged at the time the rock shaft 148 is rotated in a counterclock direction incident to descent of the ram 160 at the termination of the tensioning portion of the tool cycle.

THE PENUMATIC CONTROL DEVICES

The pneumatic control system by means of which the tensioning and sealing tool is caused to effect an initial tensioning function followed by a sealing function includes a plurality of control devices certain of which have a purely pneumatic function, while others perform an additional mechanical function. Certain of these devices are in the form of valve structures which are disposed in the upper region of the large rear body portion of the main casing section 12 in the general region of the section line 8—8 of FIG. 5 and reference to this latter view will disclose them in the positions which they assume at the commencement of the tool cycle after the tool has been supplied with air through the quick-release fitting 36. These control devices include a manually operable main valve MV having a start button 212 associated therewith, this valve being normally closed and being operable upon opening thereof to supply air to the motor M within the casing section 20; a speed valve SV which automatically regulates the amount of air supplied to the motor M from the main valve MV in accordance with the functional demand for excess or increased air during the sealing portion of the tool cycle; a plunger valve PV, the principal function of which is to admit air to the opposite ends of the ram cylinder 164 (FIGS. 3A, 9 and 14) and which, in itself, is pneumatically operable; and a relief valve RV which is an adjunct to the plunger valve PV in that it performs a special function in connection with the operation of the latter; and a timing valve TV having an adjustable orifice which controls the flow of air to an accumulation chamber for purposes that will be made clear presently.

As previously stated, the various valves mentioned above are contained in the rear upper region of the casing section 12 and motor mount 22 and the various movable valve bodies, plungers or the like associated therewith are movable within respective valve chambers formed in the casing for their reception. The previously mentioned accumulation chamber, as well as the porting for the valves and the passages which extend between such valves or from such valves to other and remote pneumatic devices have been illustrated largely in dotted lines but it will be appreciated that the illustrated channeling of passages is not necessarily directionally the same as that which is resorted to in actual practice.

An additional pneumatic instrumentality associated with the tool 10 consists of a relatively small stop piston and cylinder assembly SP (FIGS. 5 and 7) which releases a valve plunger associated with the main operating valve MV for a purpose that will be made clear subsequently.

(The Main Valve)

As best shown in FIGS. 8 and 10, the main valve MV involves in its general organization a valve plunger 220 which is slidable in a valve chamber 222 and carries a medially disposed valve element 224 which cooperates with a valve seat 226 and is maintained seated thereon by means of a spring 228. An air inlet port 230 on the forward side of the valve seat communicates through a passage 232 leading from the quick-release fitting 36 by means of which air is supplied to the tool. An air outlet port 234 on the rear side of the valve seat 226 communicates through a passage 235 with the speed valve SV for a purpose that will be made clear subsequently.

(The Main Valve Latch and Release Mechanism)

The rear end region of the valve plunger 220 is formed with an annular latch groove 236 (FIGS. 3, 4, 7 and 14) which is designed for cooperation with a latch shaft 238 having a relieved half-moon pawl section 240 which is spring pressed as shown at 242 so that normally the pawl section is adapted to enter the latch groove 236 when the start button 212 and plunger 220 are depressed. The latch shaft 238 projects outwards of the casing section 12 as shown in FIGS. 1 and 9 and carries a manually operable emergency trip release finger 244 which is conveniently accessible to the operator of the tool.

The extreme forward end of the valve plunger 220 projects forwardly from the casing section 12 and is designed for cooperation with the aforementioned foot release latch element 70 as will be described presently, the latch element being yieldingly biased against the valve plunger 220 by a spring 243. In order to release the plunger 220 from its latched position, one end of the latch shaft is provided with a second half-moon extension or flat 245 (FIGS. 5, 7 and 14) which is adapted to be engaged by the lower end of a piston rod 246 associated with a stop piston 247 which is disposed in a cylinder 248. The stop piston is biased upwardly by a spring 249 and is effective when actuated to restore the various tool parts to their normal positions.

(The Speed Valve)

As shown in FIGS. 8 and 10, the speed valve SV comprises a valve chamber 250 within which there is disposed a slidable valve body 252, the chamber communicating with the outlet port 234 of the main valve MV through the passage 235. The valve body 252 is of the spool type and its position determines the effective size of an outlet port or orifice 254 which communicates through a passage 256 with the motor M for motor energizing purposes. The valve body 252 is biased by a spring 258 against the inner end of an adjusting screw 260. When the valve body 252 is in engagement with the screw 260, the outlet orifice 254 becomes partially covered and adjustment of the screw controls the effective size of the orifice. As will be described subsequently, the valve body 252 is held in engagement with the adjusting screw 260 during the tensioning portion of the tool cycle. When the screw is adjusted for a small orifice opening a small amount of air will be forwarded to the motor and, as a consequence, a low tension will be maintained in the strapping loop. When the screw is adjusted for a larger orifice opening, a correspondingly larger amount of air will be forwarded to the motor to create a higher tension in the strapping loop.

On the rear side of the valve body opposite the orifice 254 is an air inlet port 262 which communicates with a passage 264 leading to the plunger valve PV and through which air is received from the latter valve at the commencement of the sealing portion of the tool cycle for the purpose of shifting the valve body 252 to its position of maximum opening to satisfy the increased demand for air during the sealing cycle. For reasons that will be made clear presently, the valve body 252 remains seated against the adjusting screw 260 during the tensioning portion of the tool cycle it restricts the flow of air to the motor M in accordance with the setting of the adjusting screw. The adjusting screw therefore constitutes, in effect, an adjustment for strap tension in the strap loop being operated upon by the feed wheel 42.

(The Plunger Valve)

As best seen in FIGS. 8 and 10, the plunger valve PV is in the form of a pressure relief poppet valve which is responsive to the pressure of air supplied to the air motor M and which is effective when a predetermined degree of pressure is attained in the supply line leading to the motor to terminate the tensioning portion of the tool cycle and initiate the sealing portion thereof. When such back-up pressure attains a predetermined maximum as a result of resistance to normal feed wheel motion as the air motor approaches or attains a condition of stall, this pressure is effective upon a diaphragm 270 associated with the plunger valve PV to actuate the latter. The diaphragm has its edges clamped between a portion of the motor mount 22 and an adjacent portion of the casing section 12 while a poppet spool 274 which is slidable in a valve chamber 275 is provided with an enlarged head 276 which bears, under the influence of a spring 277, against the inner side of the diaphragm and forces the same against a sealing annulus 278 which surrounds an inlet port 280 associated with a pressure chamber 282 on the outer side of the diaphragm 270. The inlet port 280 communicates with a passage 284 which is connected to the passage 256 in the immediate vicinity of the air inlet for the motor M. The passage 284 is provided with a small internal restricted orifice for preventing the starting up surge pressure in the motor feed line 256 from being reflected in the pressure chamber 282 prematurely as will be described when the circuit diagram of FIG. 14 is discussed. A manually accessible adjusting screw 288 is provided for regulating the compressional force of the spring 277 and is provided with a knurled operating knob 289 exteriorly of the casing.

The arrangement of parts set forth above affords a quick and sudden activation of the poppet spool 274 at such time as the pressure developed at the inlet fort of the motor M rises above a predetermined maximum. Prior to the attainment of such a predetermined pressure, the force of the spring maintains the diaphragm seated against the sealing annulus 278 and overbalances the total air pressure acting on the circular area which is bounded by the annulus 278. The diaphragm therefore remains in sealing contact with the annulus until such time as the pressure in the pressure chamber 282 overcomes the force of the spring 277, at which time the diaphragm is forced away from the annulus and "cracks open" so to speak, whereupon the pressure of air at the inlet port 280 may act on substantially the entire area of the diaphragm, thereby rapidly forcing the poppet spool 274 from the normal retracted position in which it is shown in FIG. 8 to the advanced position in which it is shown in FIG. 10.

The valve chamber 275 of the plunger valve PV is provided with a series of five small ports which appear in FIGS. 8 and 10 but which have been labelled $a$, $b$, $c$, $d$, and $e$ in FIG. 10A since lack of space prevents their application in the former two views.

The poppet spool 274 is provided with a series of spool flanges including a pair of end flanges 290 and 292 and two intermediate sealing flanges 294 and 296. The port $a$ is an exhaust port which leads through a passage 298 to the atmosphere. The port $b$ communicates through a passage 300 with a port 301 (FIGS. 3A and 9) adjacent the bottom of the ram cylinder 164. The port $c$ communicates through a passage 302 leading to the air supply fitting 36. The port $d$ communicates through the previously mentioned passage 264 which extends from the outlet port 262 of the speed valve SV and it also communicates through a passage 305 (FIGS. 3A and 5) leading to a port 306 adjacent the upper end of the cylinder 164. The port $d$ further communicates with the timing valve TV as will be described when the nature of such valve is set forth. The port $e$ is an exhaust port having a passage 304 leading to the atmosphere.

(The Relief Valve)

The relief valve RV (FIGS. 8, 10 and 10B) is an adjunct of the plunger valve PV and is positioned in the immediate vicinity of the latter. This valve embodies a cylinder 321 from which there projects a spring-pressed valve plunger 323 which projects through a passage 325 leading from the cylinder 321 to the portion of the pressure chamber 282 of the plunger valve PV surrounding the sealing annulus and which has its lower end resting on the diaphragm 270. The plunger 232 is, in effect, a diaphragm follower and it normally is maintained in a raised position as shown in FIG. 8 wherein the pressure chamber 282 communicates with the atmosphere through the passage 325 and cylinder 321 (see also FIG. 14). At such time as the valve spool 274 of the plunger valve PV moves downwardly at the termination of the tensioning portion of the tool cycle as previously described, the valve plunger 323 also moves downwardly so that a valve element 327 on the upper end of the plunger cooperates with a valve seat 329 and seals the pressure chamber 282 against escape of air so that the pressure of air in the chamber will be maintained during the strap sealing operation. The relief valve RV is provided for the purpose of bleeding the pressure chamber to the atmosphere to allow the diaphragm to return to its retracted position when the valve spool is returned to its initial position at the end of the tool cycle.

(The Timing Valve)

The timing valve TV is provided for the purpose of controlling the duration of the welding cycle portion of the tool by regulating the flow of air to the cylinder 248 associated with the stop piston 247 (FIGS. 5, and 7), thereby tripping the aforementioned latch plunger 220 by means of which the operation of the tool is terminated and the various parts thereof restored to their initial positions. This valve TV comprises a manually adjustable valve body 310 (FIGS. 8 and 10) which is threadedly received in a bore 312 provided in the casing section 22 and cooperates with a valve seat 314 in regulating the flow of air from an air inlet port 316 to an air outlet port 318. The inlet port 316 communicates through a passage 317 with the passage d of the plunger valve PV while the outlet port 318 communicates with a passage 320 (see also FIG. 5) leading to an accumulation chamber 322 which, in turn, communicates through a passage 324 leading to the upper end of the cylinder 248 associated with the stop piston 247.

OPERATION OF THE TOOL

Although a description of the operation of the herein described strapping tool with reference to FIGS. 1 to 13 inclusive could readily be presented for a full understanding of such operation, the description would necessarily be extremely detailed and difficult to follow. For this reason, the pneumatic circuit diagram of FIG. 14 has been prepared and provided with adequate schematic mechanical disclosure that the basic operation of all essential phases of the tool may be ascertained substantially from this view alone but with occasional reference to certain other views of the drawings. For a description of the initial loading of the tool with the strapping loop, reference will be made to FIGS. 1, 3 and 4 in addition to FIG. 14. For most other functions, the schematic disclosure of FIG. 14 will suffice.

It will be understood that in FIG. 14 the previously used reference numerals associated with the various valve and piston ports, as well as with the illustrated moving tool parts, and the fixed casing parts, have been preserved. However, the air passages illustrated in FIG. 14 are somewhat different from those illustrated and described in connection with FIGS. 3A, 4, 5 and 8 through 10B, although functionally they are the same. Therefore a different sequence of numerals has been employed to described these passages. The air flow through the passages of FIG. 14 is the same as that associated with the passages of the other views. It will be understood also that all of the passages except that provided by the flexible air line 38 (FIG. 1) are internal passages variously formed within the composite tool casing 12, 14, 16, 18, 20 and 22.

(Strap Loading)

Loading of the strapping loop into the tool preferably is performed after the tool is supplied with air, thus insuring maximum separation of the sealing jaws 100 and 102 so that the strapping may readily be inserted between these jaws. As soon as the flexible air line 38 has been applied to the air fitting 36, air will flow from the air fitting to the inlet port 230 of the main valve MV through passages 21 and 23 and enter the main valve MV. Since the main valve is spring-biased to its closed condition as previously described, the air thus conducted thereto cannot pass through the valve and therefore the motor M will remain deenergized. At the same time, air will flow from the fitting 36 through passages 21, 27 to the port c of the plunger valve PV. At this time the plunger 274 of this valve will be in its retracted position due to the absence of air pressure in the pressure chamber 282 rearwardly of the diaphragm 270 so that air entering the valve through the port c will leave the chamber through the port b and flow through a passage 29 and enter the bottom of the cylinder 164 through the port 301 thereby holding the piston 162 in its raised position. At this time air will be bled to the atmosphere above the piston through the port 306, passages 31, 33 and ports d and e of the valve PV. As previously described, the sealer block 120, being spring biased upwardly, at all times follows the movement of the piston 162 so that with the piston in its raised position, the sealer block 120 and its attached cutter latch 80 also will be raised so that the upper sealing jaw as well as the pressure foot 84 will be positioned above the level of the lower fixed sealing jaw. This condition of the tool constitutes the "ready position" thereof and is one which permits loading of the strapping loop into the tool.

To load the tool, the same is initially manually guided to bring the tool base 11 to a position wherein its underneath surface bears against the article or bundle to be strapped. With the tool thus positioned, the flat strapping is pulled forwardly from a supply roll (not shown) or other source of strapping and then caused to be looped around the article undergoing strapping, after which the free end region thereof is pushed sidewise into the space existing between the pressure foot 84 (FIG. 3) of the cutter latch 80 and the tool base, as well as the space between the movable and fixed sealing jaws 102 and 100 which now are separated. At this time, the tensioner foot 52 remains separated from the feed wheel 42 under the holding action of the foot release latch 70 as previously described so that the free end of the strapping may also be pushed sidewise between the foot 52 and feed wheel 42. Thereafter, the latch release element 86 is depressed, thus releasing the cutter latch 80 which moves downwardly so that the pressure foot 84 seats on the free end region of the strap and clamps it hard against the base. Thereafter, the upper strap overlap U is inserted sidewise between the spring pressed detent ball 85 and the pressure foot 84 so as to become clamped therebetween. This upper overlap U also is pushed sidewise above the lower overlap L and between the feed wheel 42 and the tensioner foot 52, thereby completing the loading of the tool. It will be appreciated that at this time the inner region of the strap overlap is securely clamped in position between the pressure foot 84 and the base 11, while the free end region of the strapping is loosely positioned between the feed wheel 42 and the gripper anvil 54.

(Strap Tensioning)

With the tool thus loaded, the start button 212 associated with the main valve MV is depressed to simultaneously cause air to flow through the valve and trip the foot latch 70 so as to release the foot casting 46 (FIG. 9) and bring the tensioner foot 52 and its associated gripper plug or anvil 54 into cooperation with the feed wheel 42 for strap-engaging purposes. At the same time the latch shaft 238 becomes effective to latch the plunger 220 of the main valve MV in its forward position as shown in dotted lines in FIG. 14. With the plunger thus latched, the valve MV will be in its open condition so that air will flow from the air supply fitting 36, through passages 21, 23, inlet and outlet ports 230, 234 of the valve MV, and passage 35 and enter the speed valve SV which is at this time held in its orifice-restricting position by the spring 258. The air thus conducted to the speed valve SV will therefore pass through the restricted orifice 254 and passage 37 to the motor M, thus energizing the same so that its rotation will effect driving of the feed wheel 42 through the clutch C (FIGS. 9 and 11) which, at this time, remains closed under the influence of the clutch spring 180.

Such operation of the feed wheel takes place at normal feed wheel speed due to the restriction of the speed valve orifice 254 and strap tensioning is, at this time, commenced. During such tensioning, the feed wheel causes the upper strap overlap U to slide rearwardly over the lower strap overlap L to shrink the loop of strapping about the article undergoing strapping. During such tensioning operation, the tension in the strapping loop is reflected by back-up pressure in the internal air feed passages 39 and 31 which are disposed within the motor casing 20. When a predetermined degree of tension is attained, the motor M approaches a condition of stall and the pressure in these internal passages rises sharply and is transmitted through passage 41 to the plunger valve PV so as to act against the central portion of the diaphragm 270 within the area defined by the annulus 278. Prior to attainment of such maximum pressure, the force of the spring 277 maintains the diaphragm 270 in sealing contact with the sealing annulus 278 and when the pressure of such air overbalances the pressure exerted by the spring, the diaphragm is forced away from the annulus and thus "cracks open," so to speak, whereupon air pressure from the passage 41 acts on the entire area of the diaphragm 270 to effect a rapid stroke of the valve spool 274 so that the same assumes the position in which it is shown in FIG. 10. At this time the tensioning operation is completed and is automatically and immediately followed by the sealing operation.

(Strap Sealing)

Upon shifting of the position of the valve spool 274 of the plunger valve PV, air will flow from the inlet fitting 36 through passages 21, 27, ports c and d, and passage 43 to the speed valve where it enters the port 262 and forces the valve body 252 to the left as viewed in FIG. 14 against the action of the spring 258, thus fully uncovering the port 254 and obtaining maximum air flow to the motor M through the previously described circuit embodying the passage 37. This causes the motor M to run at an increased speed to accommodate the increased demand for motor speed and consequent rapid sealer block reciprocation. At the same time, air will flow from the air supply fitting 36, through passages 21, 27, port c of the plunger valve PV, port d, and passages 33, 31 to the cylinder port 306 at the upper end of the cylinder 164, thereby driving the piston 162 and ram 160 downwardly so that the tool parts assume the positions in which they are shown in FIG. 9. Such downward movement of the ram 160 causes actuation of the crank 76 so that the pressure roller 152 forces the sealer block and pressure pad assembly 104 (see also FIG. 6) downwardly and brings the sealing jaws 102 and 100 into sealing cooperation with the strap overlap U and L. As the sealer block moves downwardly, the latch release element trips over the shoulder 87 on the cutter latch and assumes a position beneath such shoulder as shown in FIG. 9. As previously stated, during such downward movement of the sealer block 120, the shearing edges 95 and 96 on the block and pressure foot 82 cooperate with each other to effect the strap severing operation as shown in FIG. 9.

It will be remembered that at this time the motor continues to operate at high speed and that the shifted position of the crank 76 causes the normally engaged clutch C to become disengaged through the medium of the locking pawl 210 as previously described. This movement of the crank also engages the brake B so that the disengaged section of the divided gear train leading to the feed wheel 42 remains motionless and holds the feed wheel against reverse rotation so as to maintain the tension in the strap loop. The main section of the gear train however continues to function, thus causing rapid oscillation of the oscillating bushing 122 and consequent reciprocation of the now lowered sealer block 120.

Inasmuch as different plastic strap materials such as nylon, polypropylene and the like possess different fusion characteristics, it is necessary that means be provided for regulating the duration of the sealing cycle to limit the overall or total friction travel of the upper strap overlap U across the lower strap overlap. This is the function of the timing valve TV and its associated stop piston and cylinder assembly SP (see also FIG. 5). Accordingly, immediately after descent of the piston 162 and ram 160 to initiate the commencement of the sealing portion of the tool cycle as previously described, the shifting of the valve spool 274 of the plunger valve PV allows air to flow from the supply fitting 36, through passages 21, 27, ports c and d of the plunger valve PV, passages 33, 47, inlet port 316 of the timing valve TV, outlet port 318, passage 49, accumulator chamber 322, and passage 51 to the cylinder 248 of the stop piston and cylinder assembly SP. As air pressure gradually builds up in the cylinder 248 the piston 247 moves downwardly and causes the lower end of the plunger 246 to engage the pawl section 240 of the latch shaft 238 (see also FIG. 3) and rotate the same to such an extent that the plunger 220 of the main valve MV is released and thus restored to its retracted position under the influence of the spring 228.

As soon as the plunger 220 of the main valve MV is restored to its initial position, the various tool parts return to their normal position. Since the return of the plunger 220 closes the main valve MV, air to the speed valve SV is shut off so that the latter no longer supplies air to the motor M. With the motor thus deenergized, all gearing movements are terminated and reciprocation of the sealer block ceases. The drop in pressure in the passage 41 leading from the motor M. causes the pressure in the pressure chamber 282 of the plunger valve PV to collapse, thus restoring the diaphragm 270 and valve spool 274 to their initial positions. With the valve spool thus shifted, the previously described pneumatic circuit extending from the air supply fitting 36 through the valve PV and to the port 301 adjacent the bottom of the cylinder 164 allows air to again enter the lower end of the cylinder 164 and drive the piston 162 and ram 160 upwardly to actuate the crank 76 and allow the sealer block 120 to become raised under the influence of the supporting springs 138 (see also FIG. 3). Upward movement of the sealer block 120 is accompanied by upward movement of the latch release element 90 and, during such movement, the latch fingers 90a engage the latch shoulders 91 and consequently cause the cutter latch 80 to be raised in unison with the sealer block so that the pressure foot 82 is raised from the base 11. When the sealer block becomes fully raised, the cutter latch is restored to the position in which it is shown in FIG. 3.

At the same time the pawl section 240 of the latch shaft 248 releases the plunger 220 of the main valve MV, the foot release latch 70 returns under the influence of the spring 243 (FIG. 9) from the dotted line position of FIG. 14 to the full line position thereof (see also FIG. 3) so that the latch shoulder 72 will move beneath the latch finger 74 which has not yet been lowered by the crank 76. Immediately thereafter, as the piston 162 moves upwardly as previously described, the crank 76 will rotate in a clockwise direction to force the foot release latch downwardly and thus swing the foot casting 46 in a counterclockwise direction and swing the tensioner foot 52 away from the feed wheel 42 to release the strapping therebetween. The tensioned strapping is then free from any clamping action on the part of the tool 10 and the tool may then be removed from the strapped article by moving the same sidewise to withdraw the tool from the strap loop. Finally, the free end of the strapping source which remains clamped between the ball detent 94 (FIG. 9) and the pressure foot 84 may be pulled forcibly from its lightly clamped position. With all of the parts thus restored to their initial positions, the tool is ready for the next succeeding strapping operation.

From the above description, it is believed that the nature and operation of the present sealing tool will be readily understood without further description. However, hitherto unmentioned refinements have been incorporated in the disclosure of FIG. 14. For example, a small restriction orifice 59 is interposed in the internal motor passage 31 to prevent the starting-up surge in the motor feed line from prematurely tripping the plunger valve PV. Additionally, a surge chamber 61 is shown in dotted lines in the passage 41 for the same purpose. In the design and manufacture of the tool, if the volumetric capacity of the line 41 is relatively large, such surge chamber and restriction orifice need not be employed. It is also to be noted that the point at which the line 41 communicates with the air inlet passage arrangement for the motor M is close to the motor inlet port. Thus the back-up pressure in the line at such time as the motor approaches its condition of stall is translated to the plunger valve PV with no eddy current or surge losses which otherwise might take place. The orifice 59 and surge chamber 61 further afford a time delay or lag with respect to the upward movement of the sealer block 120, thus allowing time for solidification of the fused joint before clamping pressure is relieved.

The invention is not to be limited to the exact arrangement of parts shown in the accompanying drawings or described in this specification as various changes in the details of construction as well as in the pneumatic control system, may be resorted to without departing from the spirit of the invention. For example, although the invention has been illustrated and described in connection with a tool which effects a sealing of the strap loop overlap by a fusion method, certain of the mechanical and pneumatic instrumentalities utilized in connection with the illustrated and described tool may be found useful in connection with a tool which applies a mechanical seal to such strap overlap. Therefore, only insofar as the invention has particularly been pointed out in the accompanying claims is the same to be limited.

Having thus described our invention, what we claim and desire to secure by letters patent is:

1. In a pneumatically operable strapping tool for tensioning a loop of thermoplastic strapping having overlapping end portions about an article and thereafter effecting interfacial fusion of said end portions to provide a joint, an air-operated motor having an air supply port, an air supply line leading to said port, a fixed pressure jaw and a cooperating displaceable vibratory pressure jaw for engaging said overlapping end portions to produce interfacial friction therebetween and thus create said joint, said vibratory jaw being shiftable bodily between an advanced strap-engaging position and a retracted strap-releasing position, an eccentric driving connection between said motor and movable jaw for effecting continuous vibration of the latter in any shifted position thereof, spring means yieldingly biasing said vibratory jaw toward its retracted position, an air-operated ram connected to the vibratory movable jaw and effective when supplied with air to shift the latter to its advanced strap-engaging position, a pressure-responsive plunger valve operatively connected to said air supply line and ram, said plunger valve including a plunger which is effective in a retracted position to supply air to said ram at a predetermined rate and in an advanced position to discontinue such supply of air, means normally maintaining said plunger in its retracted position, and a pressure chamber operatively connected to said supply port, said plunger being responsive to the pressure of air in said pressure chamber whereby, when the back-up pressure of air at said supply port reaches a predetermined maximum, the plunger will be shifted to its advanced position.

2. In a pneumatically operable strapping tool, the combination set forth in claim 1, including additionally shiftable valve means interposed in said air supply line and normally effective in a first position to restrict the flow of air through said supply line, and in a second position to increase the flow of air through said supply line, and wherein the plunger of said plunger valve is effective in its advanced position to shift said shiftable valve means from its first position to its second position.

3. In a pneumatically operable strapping tool for tensioning a loop of fusible strapping having overlapping end portions about an article and thereafter effecting interfacial fusion of said portions to provide a joint, a feed wheel and a cooperating gripper anvil member engageable with said end portions to produce relative sliding movement therebetween in a loop tensioning direction, a fixed pressure jaw and a cooperating vibratory pressure jaw engageable with said end portions to produce multidirectional frictional sliding movement therebetween with consequent interfacial fusion, an air motor having an air inlet port, a first power train extending between said motor and vibratory pressure jaw and effective to produce vibratory movements of the latter, a second power train including a normally engaged clutch extending between an element of the first power train and the feed wheel and effective to produce rotation of the latter in a tensioning direction, a movable air-operated ram effective when supplied with air to force said vibratory pressure jaw into sealing cooperation with the fixed pressure jaw and to disengage said clutch, a manually operable main valve for supplying air to said inlet port, a pneumatically operable plunger valve responsive to the incidence of back-up pressure of air at said inlet port for supplying air to the ram, and means automatically effective upon disengagement of said clutch for preventing reverse rotation of the feed wheel.

4. In a pneumatically operable strapping tool, the combination set forth in claim 3 wherein said gripper anvil member is spring biased into effective cooperation with the feed wheel, the strapping tool further includes releasable latch means normally maintaining said gripper anvil member in a retracted position, and the main valve is effective upon operation thereof to release said latch means.

5. In a pneumatically operable strapping tool, the combination set forth in claim 4 including, additionally, a rotary crank member effectively interposed between and engageable with the ram and movable pressure jaw for translating movement of the ram into movement of the vibratory pressure jaw, and wherein said latch means includes a latch element movably mounted on the gripper anvil member, and a latch finger on said crank member against which said latch element normally bears to maintain the gripper anvil member out of effective cooperation with the feed wheel.

6. In a pneumatically operable strapping tool for tensioning a loop of thermoplastic strapping having overlapping end portions about an article and thereafter effecting interfacial fusion of said end portions, an air-operated motor having an air supply port, a feed wheel engageable with the strapping for tensioning said loop, a power train including a normally engaged clutch connecting the motor to the feed wheel in driving relationship, a fixed pressure jaw and a cooperating bodily displaceable vibratory pressure jaw for engaging said overlapping end portions to produce interfacial friction therebetween and consequent fusion, said displaceable pressure jaw being movable between a raised inoperative strap-releasing position and a lowered strap engaging and sealing position, a second power train connecting the motor to the vibratory pressure jaw and effective to cause vibration of the latter in any position thereof, a normally closed manually operable main air supply valve effective when actuated to supply air to said air supply port to rotate the feed wheel and effect vibration of said shiftable vibratory pressure jaw, a sealing cylinder having a ram and effective when supplied with air to project said ram, said ram, upon projection thereof, being effective to move said vibratory jaw to its lowered sealing position and to disengage said normally engaged clutch, a pneumatically operable plunger valve responsive to the incidence of back-up air pressure at said supply port and effective upon actuation thereof to supply air to said sealing cylinder, and a pneumatically operable two-position speed valve interposed between the main valve and the air supply port and operable under the control of said plunger valve, said speed valve being effective in its normal position to conduct air from the main valve to the air supply port at a predetermined rate for feed wheel driving purposes, and in another position to supply such air at an increased rate for strap-sealing purposes.

7. In a pneumatically operable strapping tool, the combination set forth in claim 9 wherein said speed valve is provided with a manually adjustable orifice for regulating the rate of flow of air to said air supply port when the valve is in its normal position.

8. In a pneumatically operable strapping tool, the combination set forth in claim 6 including, additionally, releasable latch means effective upon actuation of said main valve to maintain the same actuated, a latch release cylinder having a normally retracted latch tripping plunger adapted upon projection thereof to engage the latch means and disable the same, said plunger valve being effective upon actuation thereof to supply air to said latch release cylinder to project said latch tripping plunger.

9. In a pneumatically operable strapping tool, the combination set forth in claim 8 and including, additionally, time delay means for regulating the flow of air from the plunger valve to the latch release cylinder to thus determine the length of time the latch means remains effective.

10. In a pneumatically operable strapping tool, the combination set forth in claim 9, wherein said time delay means includes an air accumulation chamber interposed between the plunger valve and latch release cylinder and effective when a predetermined air pressure has been attained therein to actuate the latch release cylinder.

11. In a pneumatically operable strapping tool, the combination set forth in claim 10, wherein said time delay means further includes a timing valve having an adjustable orifice interposed between the plunger valve and air accumulation chamber for regulating the rate of flow of air from the plunger valve into the air accumulation chamber.

12. In a pneumatically operable strapping tool, the combination set forth in claim 9, wherein said plunger valve embodies a valve cylinder and an enlarged pressure chamber at one end thereof and in communication with said air supply port for the motor, said pressure chamber defining an internal sealing annulus, a flexible diaphragm extending across said chamber and having an effective area greater than the overall area of the sealing annulus, an axially shiftable valve spool slidable in said valve cylinder between a normal retracted position wherein it bears yieldingly against the diaphragm and urges the latter against the sealing annulus so that air pressure in the chamber is effective against only the central region of the diaphragm, and an extended position wherein air pressure in the chamber is effective against the entire diaphragm area, said valve cylinder being provided with an air inlet port connected to a source of air, and an air outlet port connected to said sealing cylinder, said valve spool being effective in its retracted position to prevent communication between said air inlet port and said air outlet port, and in its extended position to establish communication between said latter ports.

13. In a pneumatically operable strapping tool, the combination set forth in claim 12, wherein said valve cylinder of the plunger valve is provided with a second air outlet port which is connected to the speed valve, and wherein the valve spool is effective in its retracted position to prevent communication between said air inlet port and said second air outlet port, and in its extended position to establish communication between said latter ports.

14. In a pneumatically operable strapping tool, the combination set forth in claim 12, wherein said valve spool is yieldingly biased against said diaphragm by means of a compression spring, the combination including, additionally, a regulating screw for adjusting the force exerted by the spring upon the plunger whereby the plunger valve may be made responsive to varying back-up pressures at said air supply port.

15. In a pneumatically operable strapping tool, the combination set forth in claim 14 including, additionally, a restriction interposed between the air supply port and said pressure chamber and serving to prevent back-up surge pressure at said latter port incident to motor starting-up operations from prematurely actuating said sealing valve.

* * * * *